United States Patent [19]
Lockshaw

[11] 3,964,450
[45] June 22, 1976

[54] ROTARY CAM INTERNAL COMBUSTION RADIAL ENGINE

[76] Inventor: John E. Lockshaw, 519 Las Riendas Drive, Fullerton, Calif. 92632

[22] Filed: Nov. 19, 1973

[21] Appl. No.: 417,218

[52] U.S. Cl. .................... 123/55 AA; 123/190 BB; 123/190 BD; 91/493
[51] Int. Cl.² .......................................... F02B 75/22
[58] Field of Search ............ 123/44 E, 44 B, 44 D, 123/55 R, 55 AA, 190 BB, 190 BD, 56 C; 91/492, 493, 498

[56] References Cited
UNITED STATES PATENTS

| | | | |
|---|---|---|---|
| 272,562 | 2/1883 | Lenhardt | 123/44 E |
| 1,252,757 | 1/1918 | Williams | 123/55 AA |
| 1,533,514 | 4/1925 | Ragot | 123/55 AA |
| 1,853,563 | 4/1932 | Hungerford et al. | 123/44 E |
| 1,890,953 | 12/1932 | Smith | 123/44 B |
| 2,371,005 | 3/1945 | Wagers | 123/55 AA |
| 2,651,295 | 9/1953 | Le Pechoux | 123/44 B |
| 3,270,685 | 9/1966 | Eickmann | 91/492 |
| 3,392,631 | 7/1968 | Baker | 91/493 X |
| 3,799,035 | 3/1974 | Lamm | 91/493 |
| 3,875,851 | 4/1975 | Foster | 91/498 |

FOREIGN PATENTS OR APPLICATIONS

| | | | |
|---|---|---|---|
| 672,570 | 12/1929 | France | 123/55 AA |
| 372,808 | 4/1923 | Germany | 123/55 A |
| 628,470 | 11/1961 | Italy | 123/44 E |

*Primary Examiner*—Charles J. Myhre
*Assistant Examiner*—William C. Anderson
*Attorney, Agent, or Firm*—Francis X. LoJacono, Sr.

[57] ABSTRACT

This disclosure is directed to a rotary-cam, internal-combustion, radial, 4-cycle, 6-cylinder engine comprising a stationary motor block adapted to operably receive a dual set of pistons, each set thereof being juxtaposed to the other, having their respective rods extending outwardly from the piston chamber and operably attached to a rotatable casing by means of a cam follower secured to the free end of the rod and disposed within a cam channel forming part of the casing, thereby allowing each adjacent piston to simultaneously reciprocate together as the casing rotates with the main drive shaft; and wherein the main shaft incorporates both the fuel-intake system and the motor-exhaust system, said main drive shaft being fixedly connected for rotation with the casing.

16 Claims, 11 Drawing Figures

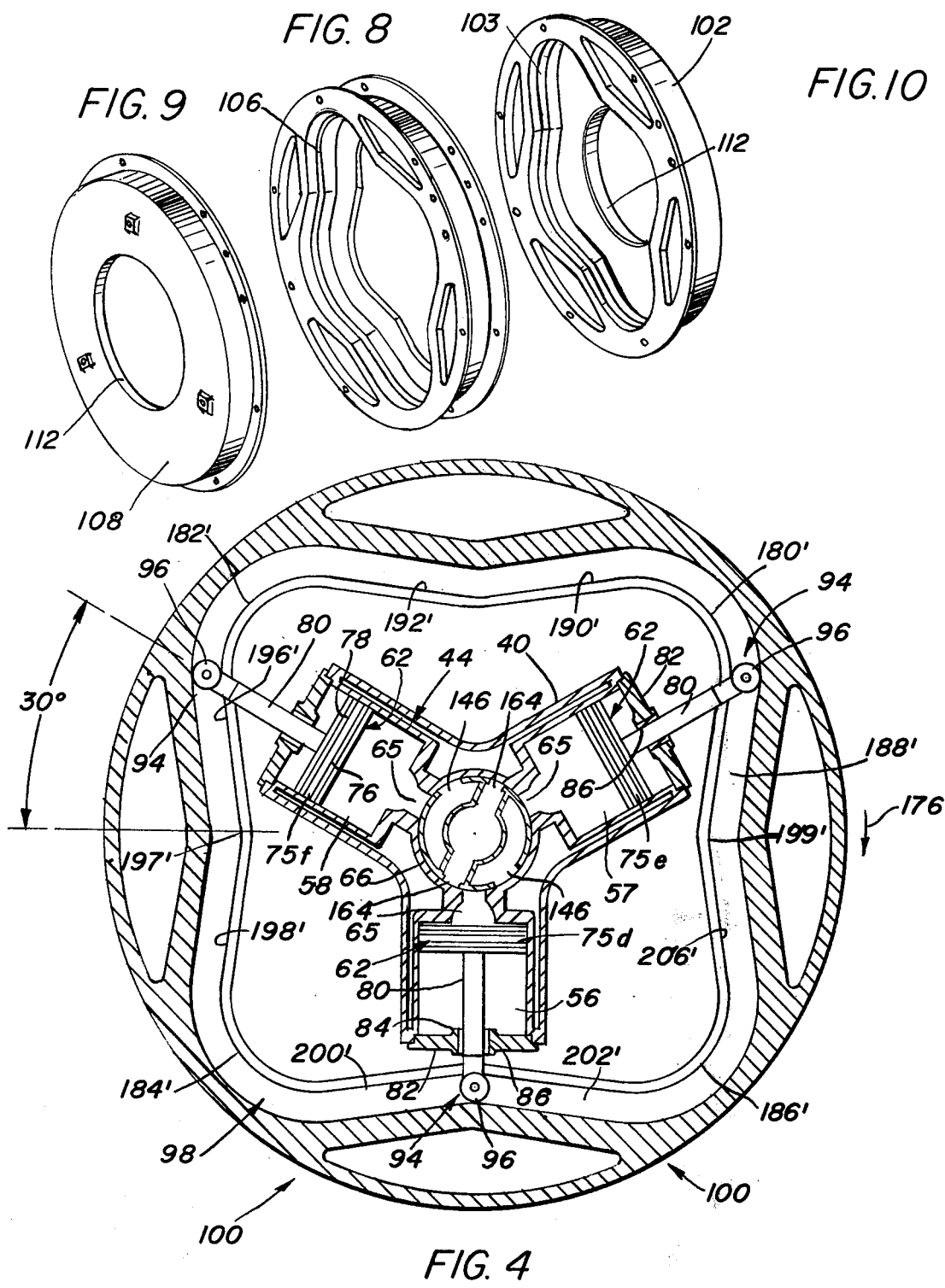

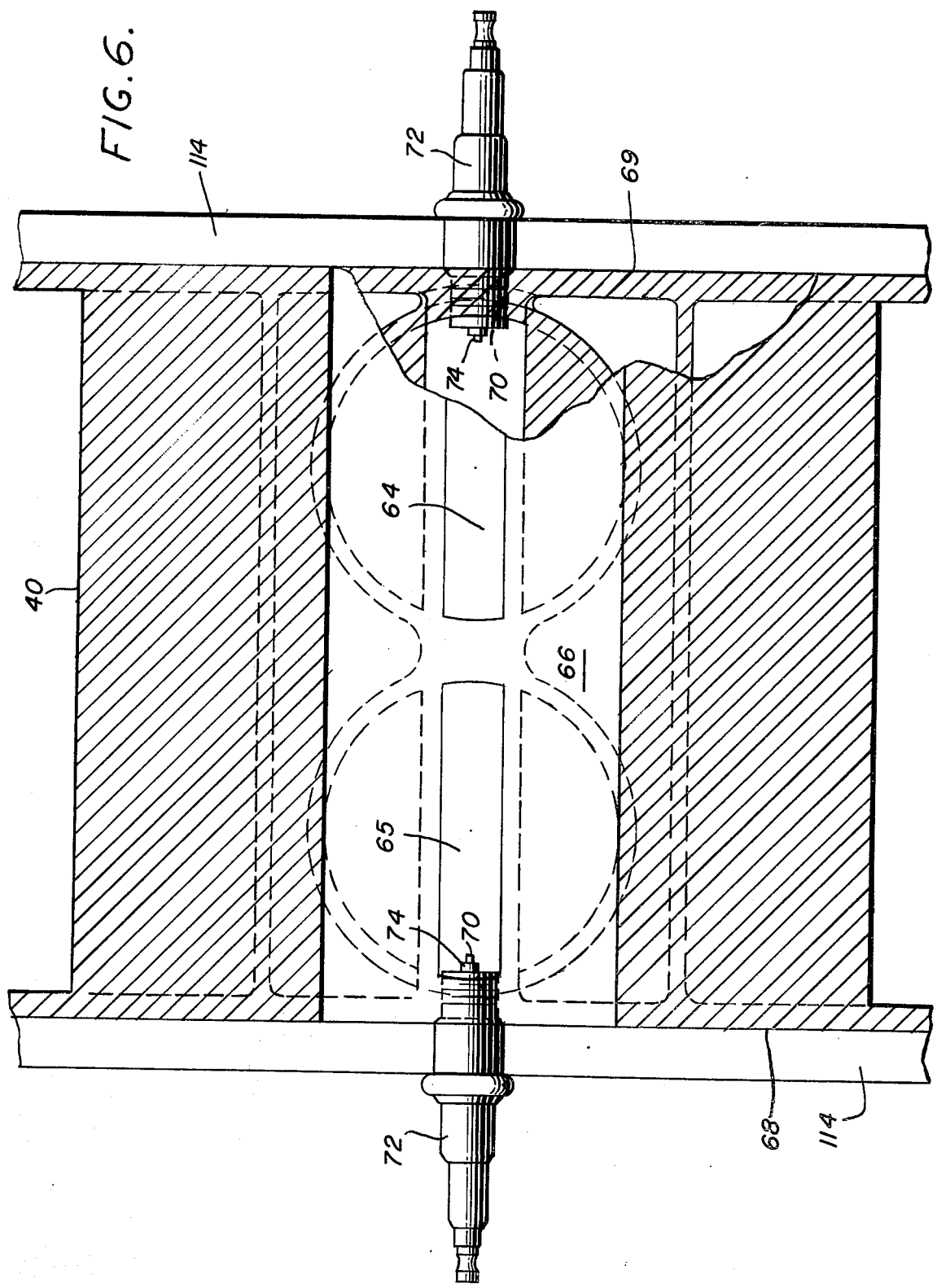

ROTARY CAM INTERNAL COMBUSTION RADIAL ENGINE

BACKGROUND

1. Field of the Invention

This invention relates to an internal-combustion engine and, more particularly, to a rotary-cam, internal-combustion, radial, 4-cycle, 6-cylinder engine having twelve power strokes per revolution.

2. Description of the Prior Art

At the present time, there are a great variety of internal-combustion engines in use, and others being tried. These engines incorporate many unique designs and sizes, as illustrated in U.S. Pat. Nos. 3,429,301; 2,263,274; 1,899,374 and 1,349,353. Each of these various types and designs of internal-combustion engines has certain features and principles common with the others — the major three universal, basic requirements being air, fuel and an ignition system, in order to render any of these engines operable. For each internal combustion engine there are as many end results — that is, different displacements and various horsepower, burning rates, r.p.m. requirements, and so on.

However, in recent years two important problems have arisen with respect to the use of internal-combustion engines, especially with respect to the reciprocating type wherein cylinders, pistons, connecting rods and crankshafts are required.

These problems are, first and foremost, air pollution — another being the development of an energy crises, particularly with respect to a fuel shortage.

Hence, not only have these types of engines become very complicated in their construction and expensive to manufacture, but they are inherently inefficient in their fuel-burning capacity. This lack of complete burning of fuel creates an air-pollution material which rapidly mixes with the atmosphere and is activated by the sun's rays to create what was heretofore referred to as "smog".

In recent years, many various apparatuses have been devised to be installed within the internal combustion engine for the purpose of controlling the unburned contaminants that are discharged therefrom. However, even with such aids as exhaust recirculation, catalytic converters and new carburetors, to name a few, contamination has not been controlled; and, in addition, engines equipped with such items have become inefficient and their performance level, also, has been reduced.

Therefore, it is recognized by the applicant that there is needed a novel, more complete, efficient, fuel-burning engine having very few moving parts.

SUMMARY

The present invention comprises an internal-combustion engine having a stationary motor block adapted to receive at least one set of radially disposed pistons. However, the preferred form provides for at least two sets or groups of three pistons which eliminate vibration, these groups being in a juxtaposed relationship to each other; and wherein each set generally includes three pistons radially extending outwardly from the centrally disposed drive shaft.

The pistons are operably interconnected for a rectilinear reciprocating motion by a cam means which comprises a cam follower attached to each of the free ends of the piston rods, and a cam channel or track formed as a part of the rotatable casing which substantially encloses the motor block therein.

Thus, the rotation of the casing provides the necessary reciprocating action for two 4-cycle operations of each piston per revolution, whereby each adjacent matching piston is at all times positioned within its corresponding cylinder at the same location therein; that is, each piston of the first set of pistons moves together and simultaneously with its adjacent corresponding piston of the second set of pistons. Thus, as an example, when one piston of the first set is being actuated in an exhaust stroke, the corresponding adjacent piston of the second set is at the same position in its cylinder — however, at this time the piston of the second set is providing a compression stroke.

There is also included a main drive shaft which is rotatably disposed within the motor block and attached directly to the outer casing for rotation therewith. The main drive shaft comprises a hollow tubular member which incorporates two distinct means, one being a fuel-intake means and the other an exhaust means. These means are defined by various longitudinal openings or slots provided within the outside circumference of the shaft. A first group of slots is so positioned on the shaft that it is disposed within an intake-manifold chamber which is supplied with the proper fuel by any well known type of carburetor. These slots are part of a fuel-intake system which includes a plurality of slots or openings positioned at such a point in the shaft that fuel is allowed to enter the proper combustion chamber of the motor, said first group of slots being interconnected by means of a communicating, co-axial, tubular passage disposed within the hollow shaft.

The exhaust means comprises a second group of elongated longitudinal slots including four sets thereof, wherein the first and second sets of the exhaust slots are located about the intermediate portion of the drive shaft so as to be selectively positioned above a particular cylinder at the proper time, to allow the exhaust from the combustion chamber to vent therefrom and through a central bore within the drive shaft, said bore being opened at each end whereby communication is provided between the third and fourth sets of elongated exhaust slots which are oppositely arranged in the shaft and disposed at the adjacent ends thereof within stationary exhaust-manifold chambers for venting therefrom.

OBJECTIVES AND ADVANTAGES

The present invention has for an important objective the provision wherein substantially all fuel is completely burned within the engine chamber, thereby providing a more efficient internal-combustion engine heretofore unobtainable.

It is another objective of the invention to provide an internal-combustion engine that eliminates excessive discharge or emission of contaminants into the atmosphere.

It is further another objective of the invention to provide an internal-combustion engine that incorporates at least two groups of pistons, wherein each group of pistons is juxtaposed to the other, and wherein each piston of one group has an identical adjacent piston from the other group, whereby each adjacent piston moves simultaneously with its corresponding piston.

It is a further objective of the invention to provide an internal-combustion rotary engine having a greatly improved radially disposed piston operation whereby the rectilinear reciprocating motion thereof is precisely controlled by a rotating cam means, wherein said cam means is an integral part of a rotatable casing about the stationary block.

A still further objective of the invention is to provide an internal-combustion rotary engine of this character that has a main drive shaft that includes both a fuel-intake means and an exhaust means.

It is another objective of the invention to provide an internal-combustion rotary engine that is simple and rugged in construction, and has a more dependable and durable life.

It is still another objective of the invention to provide an engine of the character described that is lightweight compared to horsepower, and has a suitable size and shape.

It is further an objective of the invention to provide a rotary internal-combustion engine having relatively few operating parts.

It is still a further objective of the invention to provide an engine of this character that is easy to service and maintain.

Other characters, advantages and objectives of this invention can be more readily appreciated from the following description and appended claims. When taken in conjunction with the accompanying drawings, this description forms a part of the specification wherein like references and characters designate corresponding parts in several views.

DESCRIPTION OF THE DRAWINGS

Referring more particularly to the accompanying drawings, which are for illustrative purposes only:

FIG. 4 is a transverse cross-sectional view of just the engine block to illustrate the position of the fuel outlets and the exhaust inlets with respect to the second group of pistons;

FIG. 6 is a cross-sectional view taken substantially along line 6—6 of FIG. 5.

FIG. 8 is a perspective view of the center casing, including a portion of the center cam track;

FIG. 9 is a perspective view of the front portion of the exterior casing and cam track;

FIG. 10 is a perspective view of the rear exterior casing; and

FIG. 11 is a perspective of the main drive shaft, illustrating the various elongated openings of the exhaust and fuel systems.

DESCRIPTION OF THE PREFERRED EMBODIMENT

Figure 1:
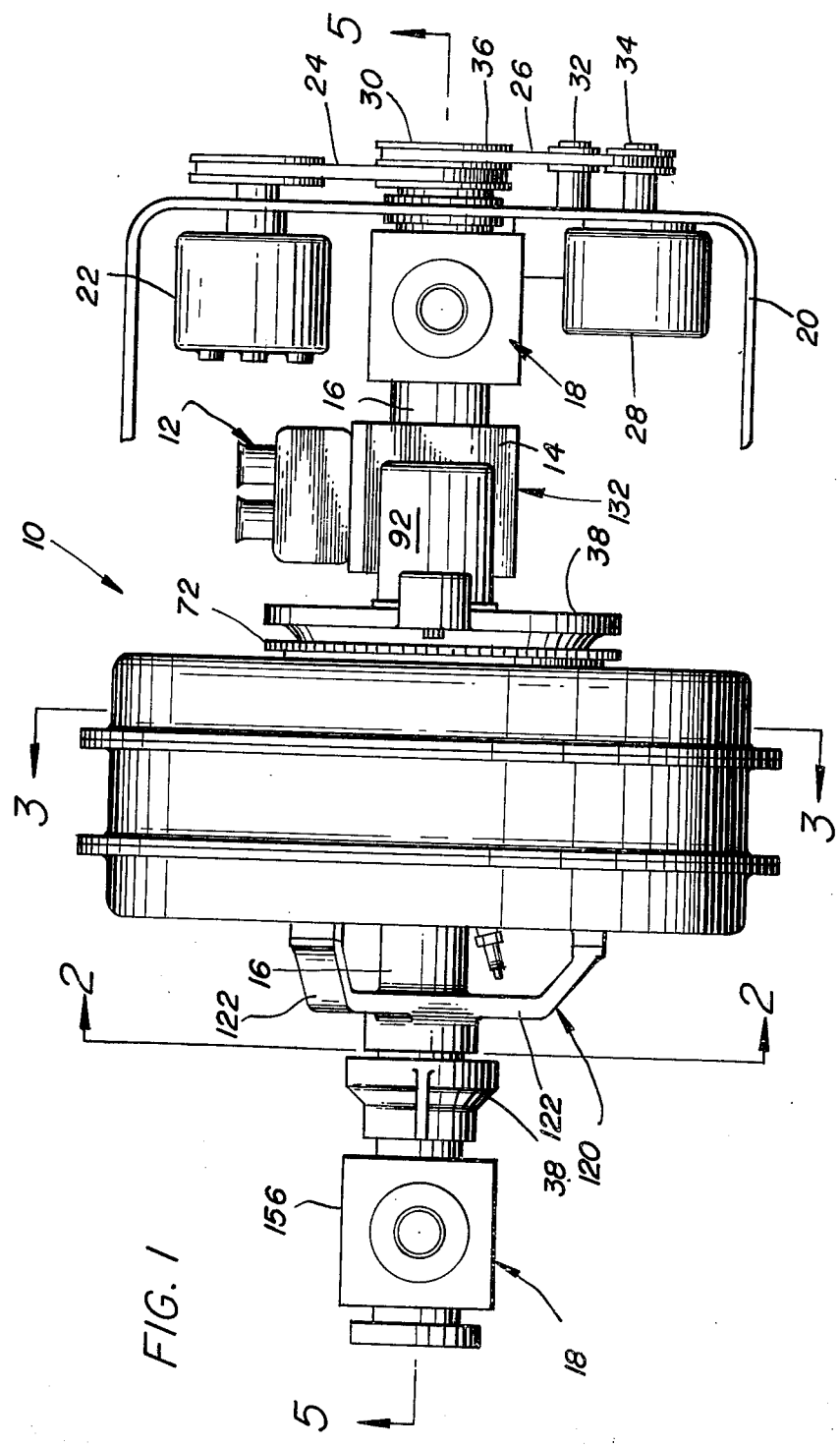
FIG. 1 is a general assembly side-plan view of the present invention illustrating various engine components generally found attached as cooperating parts of an engine system.

Referring more particularly to the drawings, there is illustrated an internal-combustion engine, generally indicated at 10, having various associated elements attached thereto. Since this engine can be mounted in numerous ways under many useful conditions, it is not shown with respect to any particular operating mode.

However, for a better understanding of the overall operation of the engine, there is illustrated a carburetor 12 adapted to be operably secured to an intake-manifold means and system, generally indicated at 14, said manifold means being supported about the main drive shaft 16. Accordingly, the drive shaft extends outwardly from both sides of the engine 10, so that adjacent the ends thereof are provided an exhaust system and means, indicated generally at 18. (The intake and exhaust systems and means will hereinafter be described in greater detail.) The forward end of the drive shaft 16 is so adapted as to be received in various support brackets, such as indicated at 20. This bracket is so designed as to accommodate various auxiliary components, such as a distributor 22 having a pully drive belt 24 operably connected to the drive shaft in the conventional manner, a water pump 26 and an alternator 28 both being driven by the extended portion of the drive shaft 16 through a set of pullies 30, 32, and 34, and operable through pully belt 36. Thus, it can be readily understood that various other auxiliary engine components can be easily adapted for operable connection to said engine 10.

There is also provided a pair of motor support means 38, one being mounted to and forward of the engine block, generally indicated at 40 (See FIG. 5), the other shown as a rear-engine support bracket.

Thus, with the above general description, together with FIG. 1, it can be seen how the overall basic assembly of the present internal-combustion engine is operable for many applications in industry.

Figure 3:
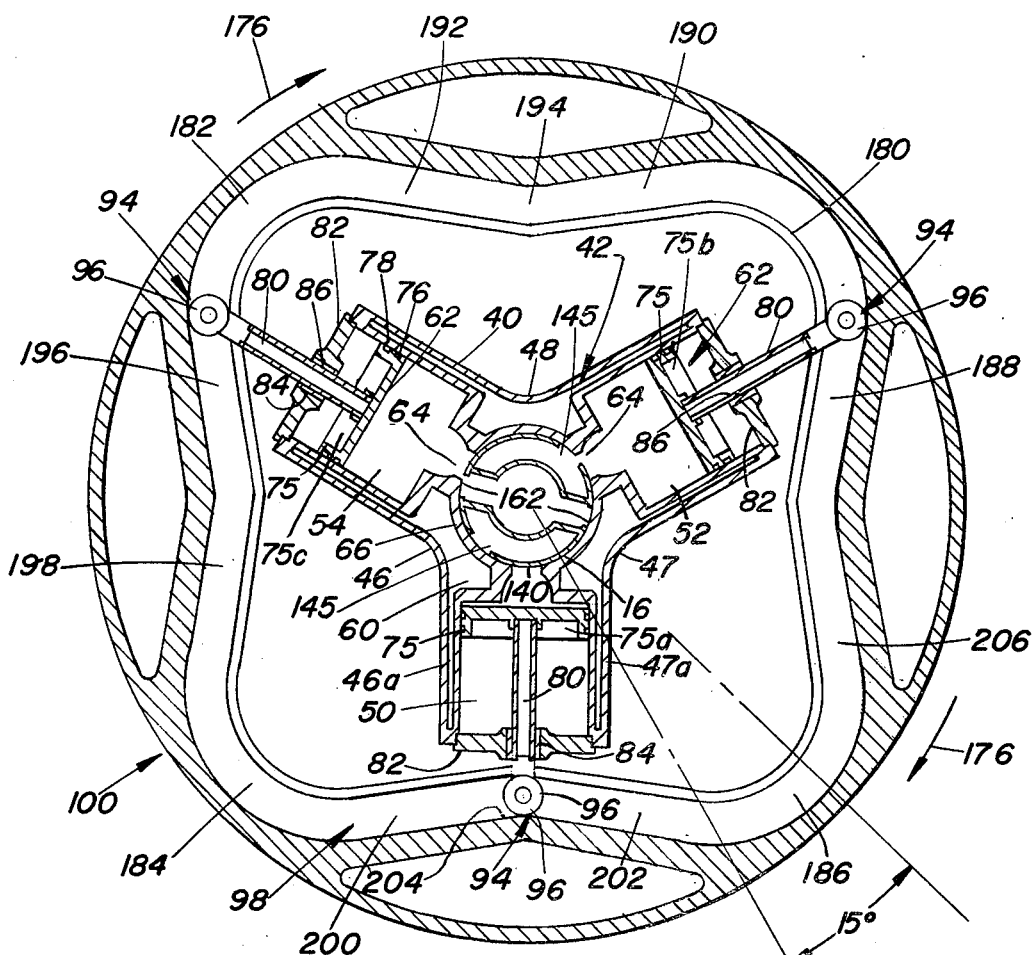
FIG. 3 is a transverse cross-sectional view of the casing and engine block taken substantially along line 3—3 of FIG. 1.
Figure 5:
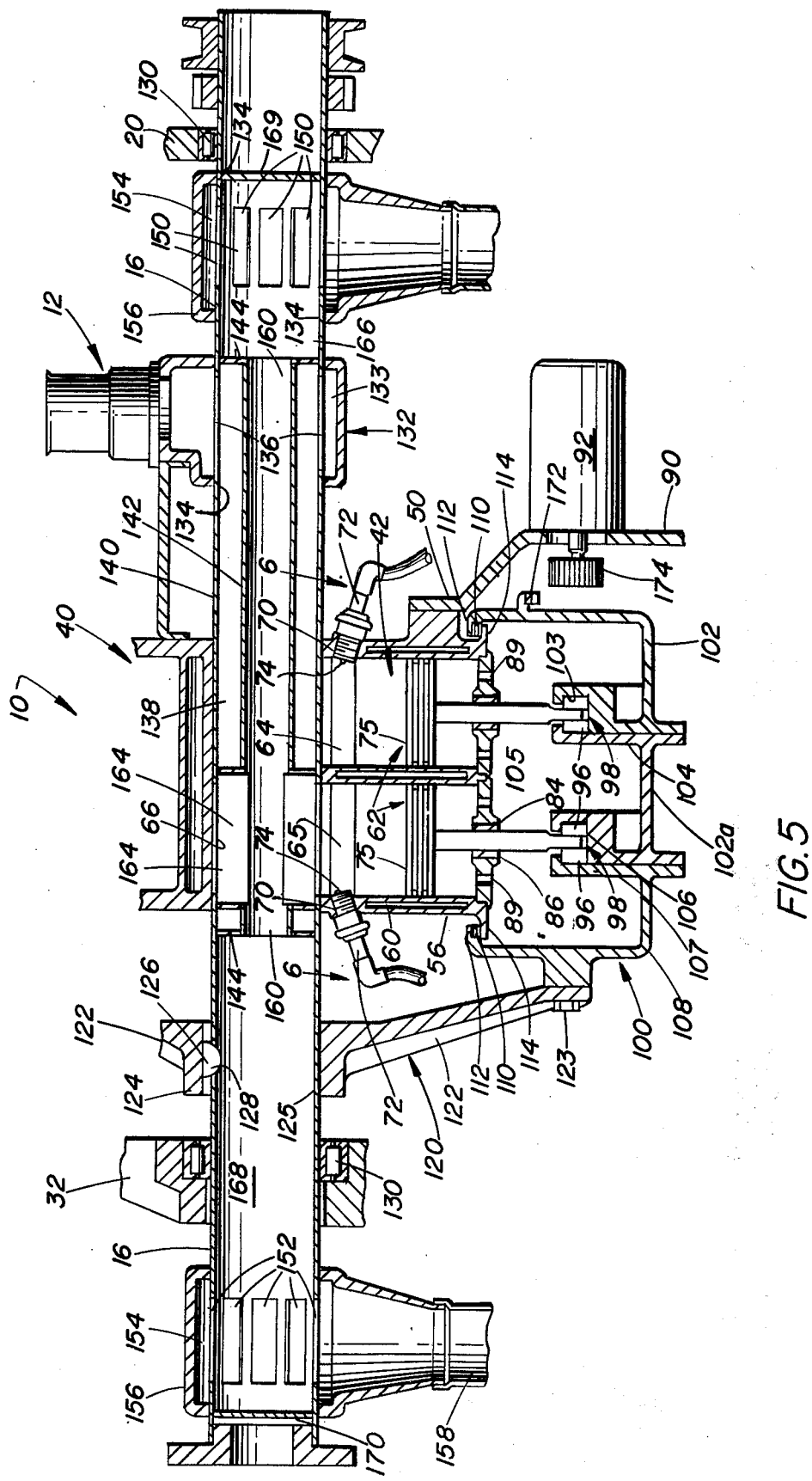
FIG. 5 is a partial longitudinal cross-section of the engine assembly taken substantially along line 5—5 of FIG. 1.

Hence, the following description of the invention will now be presented in a more detailed manner. The internal-combustion engine comprises an engine block 40, as seen in FIGS. 3 and 5, having a cross-sectional configuration of tri-radial piston cylinders in which there are provided two separate sets or groups of pistons (See FIG. 5), each group being in a juxtaposed relationship to the other. The engine as herein illustrated is provided with two adjacent groups, the first group indicated generally at 42 (See FIG. 3) and the second set or group indicated at 44 in FIG. 4. Since both groups of cylinders are the same, the description of one group will suffice.

Accordingly, the engine block 40 is defined as a hollow housing having exterior walls 46, 47 and 48, each wall thereof forming an obtuse angle disposed 120° to the other, thereby providing radially extending sections in which the plurality of cylinder bores 50, 52 and 54 of the first group are symmetrically disposed along with the second group of adjacent diametrically opposite bores 56, 57 and 58. (It should be understood, at this point, that additional groups of cylinders can be used as well.) All of the cylinder bores are recessed within the block, having an outer diameter smaller than the width between the adjacent wall, such as seen in FIG. 3, the cylinder bore 50 being so disposed between wall portions 46a and 47a that a space is allowed to form therebetween defining a water jacket and chamber 60. Thus, each cylinder within the engine block is so formed.

In addition, each cylinder is provided with an open outer end in which a corresponding piston, generally indicated at 62, is slidably received. The opposite end of each cylinder bore of said first and second groups is provided with a reduced openings 64, each opening terminating in communication with a centrally disposed tubular bore 66 being formed as an integral longitudinal member of the engine block 40 and the recessed cylinders.

Figure 7:
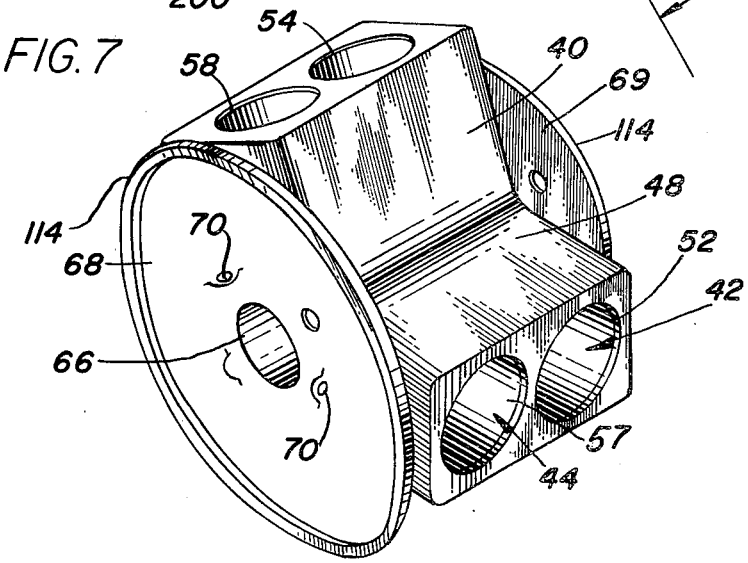
FIG. 7 is a perspective view of the motor block.

Hence, in order to complete the engine block 40, there is included opposite end walls 68 and 69, as seen in FIG. 7. Equally spaced and disposed about the face of each end wall 68 and 69 are threaded holes 70 adapted to receive a conventional spark plug 72, as viewed in FIG. 2. Said holes 70 are so positioned therein that the electrode portion 74 of said spark splugs is exposed within the explosive chamber section of each piston cylinder, and directly received in the reduced opening 64 thereof (See FIG. 6).

Accordingly, and as previously mentioned, pistons 62 are slidably received within each cylinder, each of said pistons comprising a piston head 75 having two annular grooves, one of which receives a compression ring 76 and the other receives an oil ring 78.

Secured to the piston head is a piston rod 80 which extends outwardly therefrom to enable the proper reciprocating action of the piston to occur — that is, to stabilize the sliding movement thereof, each free end of the cylinders is adapted to receive a rod-support member 82, as illustrated in FIGS. 3 and 5. Rod 80 is slidably supported within a bearing sleeve 84, said sleeve being forceably mounted within bore 86 of said rod-support member 82. Each support member 82 also includes circumferentially arranged ports 89 (See FIG. 5).

At this time, it should be clearly understood that the engine block is stationary and is held in place by various engine mounts and supports, such as the engine-block mount 90 which is also illustrated in FIG. 5 as supporting a starter 92.

Referring back to the piston rods 80, there is affixed to the extended free end of each rod a portion of a cam means, generally indicated at 94. This cam means is basic to the sequential reciprocating movement of the pistons in that it corresponds generally to the well known cam shaft used in conventional engines. However, the cam means, as taught and shown in this application, comprises a pair of rollers 96 operably secured to each free end of rods 80 representing what is generally referred to as "cam followers" adapted to be received in a cam retaining ring or track 98, as seen in FIGS. 3 and 5.

Accordingly, each group or set of pistons has its corresponding cam means so that each cam ring is disposed radially outwardly from its corresponding group of pistons, whereby the cam followers of each piston will slidably follow the somewhat curvilinear configuration of the ring 98. A detailed description of the overall operation will hereinafter be described.

To provide for the required annular location for the cam rings 98, said rings are incorporated as integral parts of the various sections making up the exterior housing or casing, generally indicated at 100. The casing 100 comprises a plurality of castings, wherein the front exterior casing 102 includes one section of a cam ring formed as channel 103 and extending inwardly of the casing, whereby the center exterior section 102a of the casing abuts thereto by means of an inwardly-extending radial wall 104 having a corresponding lip 105, thereby forming the complete channeled cam ring or track 98 disposed in alignment with piston group 42. The second cam ring aligned about the piston group 44 is similarly shaped by a channel 106 formed as an integral part of the center casing opposite its wall 104, the channel 106 being identical to that of 103. Said channel 106 also has side member 107 formed as an integral inwardly-extending wall of the rear exterior casing 108.

Thus, when the three sections of the exterior casings are assembled, as indicated in the present disclosure, it is adapted to rotate about the central axis of the motor block 40 wherein oppositely-disposed sealed bearings 110 are inter-disposed between annular flange 112 of the casing 100 and an annular radial flange 114 of engine block 40. The above description of the casing sections can be readily seen in FIGS. 8, 9 and 10; and the engine block 40 showing its annular radial flanges 114 is clearly illustrated in FIG. 7.

Figure 2:
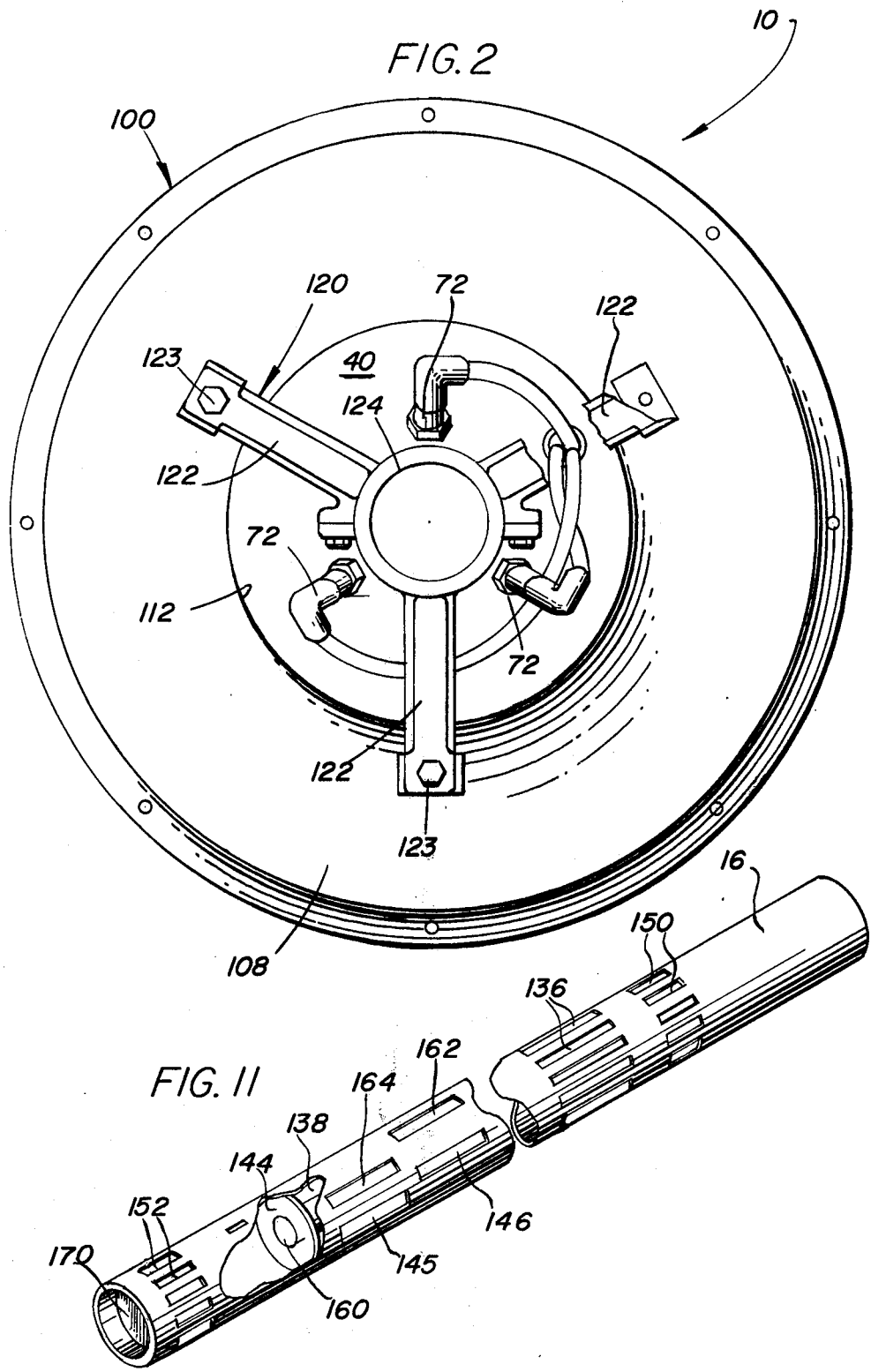
FIG. 2 is a transverse view taken substantially along line 2—2 of FIG. 1.

However, to provide the rotational movement about the engine axis of both the cam rings 98 and the housing 100, the housing is interconnected to the main shaft 16 through the coupling of a rotational transfer yoke, indicated generally at 120, and is illustrated as having a plurality of leg members 122 bolted to the rear casing 108 by bolts 123 received in the free end of each leg 122, said legs terminating at their opposite ends in an enlarged boss 124 having a bore 125 adapted to receive the rotatable main shaft 16 and being fixed thereto by means of a key 126 secured to said shaft for engagement with a matching key way 128 (See FIGS. 2 and 5).

Accordingly, as the casing 100 rotates so does the main shaft 16, thus providing the means by which the driving power is transmitted to said shaft.

Referring more particularly to FIGS. 3 and 5, the main shaft is shown as being rotatably supported within bore 66 of the engine block 40 and extending outwardly from the front and rear sides thereof, whereby the forward extension is operably supported by an equipment-support bracket 20 having a bearing 130 therein to directly receive that end of the shaft 16, and wherein the rear engine support 38 is also provided with a bearing for operable support of said shaft.

Included within the hollow shaft 16 are two important specific means heretofore unobtainable — combining within the hollow shaft a fuel-intake system or means, together with an exhaust system or means inter-disposed therein but separate thereto.

First, for a description of the construction of the fuel-intake system or means which begins in a normal manner by incorporating a conventional carburetor, generally indicated at 12, adapted to be positioned on an intake manifold, indicated at 132, said intake manifold comprising a box-like compartment 133 having aligned apertures 134 with such diameters that the drive shaft 16 is received therethrough (FIG. 5), wherein that portion of said shaft being disposed within said manifold compartment 133 is adapted with a plurality of elongated openings or slots 136, whereby fuel is transferred from the compartment 133 into a fuel cell 138 through said openings 136. The fuel cell 138 is defined by the outer tubular wall 140 of the shaft 16 and an inner tubular wall 142, having opposite end closure plates or walls 144, thus providing a communicating chamber between the manifold and fuel outlet ports 145 and 146, said outlet ports 145 and 146 being shown in FIGS. 3 and 4, respectively. The two diametrically opposed ports 145 are aligned to correspond to the fuel inlet ports 64 of each piston chamber associated with the first group of cylinders 42 as the shaft 16 rotates within the block 40. Accordingly, the adjacent ports 146 are disposed diametrically to each other and are so positioned in the wall 142 as to align with inlet ports 65 of each piston chamber of the second group of cylinders 44.

Referring again to FIG. 5, there is illustrated the previously mentioned exhaust system 18 which provides a dual exhaust outlet means comprising a first set of exhaust ports 150 located at the proximate forward end of shaft 16, and a second set of exhaust ports 152 disposed about the proximate rearward end of said shaft, each group of exhaust ports 150 and 152 being adapted to be operably received within respective exhaust chambers 154 defined by an exhaust manifold 156. Said manifolds 156 are so designed that conventional exhaust pipes 158 can be readily attached thereto.

Hence, the exhaust gas is emitted from the engine through ports 64 and 65 and into passage 160 formed by the tubular inner wall 142. Communication between ports 64 and 65 is provided by exhaust outlet ports 162 and 164 arranged about the wall 140 of shaft 16. Exhaust ports 162 are oppositely disposed to each other and are aligned with ports 64, wherein exhaust ports 164 are adjacent to said exhaust ports 162 and aligned with ports 64. Therefore, the exhaust gas will flow at the proper sequence of the operating engine so as to flow through passage 160 in both a forward and an aft direction into enlarged ducts 166 and 168, respectively — and then out of each end exhaust outlet means, said enlarged ducts 166 qnd 168 terminating just beyond their respective exhaust ports 150 and 152 by partitions 169 and 170.

Operation of the Engine

As previously described, the present invention comprises a rotatable housing or casing 100 formed by three distinct sections wherein the front exterior casing 102 is provided with a starter ring gear 172 affixed thereto in such a manner that the starter motor 92, of any well known type, is located adjacent the gear ring 172 so that the matching starter gear 174 of the starter motor can be brought into operating engagement with said ring gear 172. It is to be understood that an electrical system is used herewith, but is not shown or described due to its conventional operation which is presently well known in the auto industry.

Accordingly, when the starter 92 is electrically energized, engagement of gears 172 and 174 takes place, whereby clockwise rotation of the housing takes place, as indicated by arrows 176 in FIG. 3, causing the housing to act as a flywheel revolving about the stationary engine block 40.

Hence, the pistons are activated through the movement of the cam means 94; and the main drive shaft 16 is rotated simultaneously and in synchronism with the housing by means of the rotational transfer yoke 120 (See FIGS. 1, 2 and 5).

Thus, as the housing 100 rotates, the simultaneous movement of the cam means provides not only the reciprocating action of each piston but, due to the configuration design of the cam tracks or retaining rings 98, each piston is sequentially moved whereby proper sequential firing, compression, intake, and power function take place.

It should be understood that each piston is provided with a 4-cycle displacement, wherein two complete 4-cycle operations take place during every one full rotation of the housing 100, about the central axis of the block 40.

As illustrated in FIGS. 3 and 4, respectively, the first group of pistons 42 (FIG. 3) includes three pistons 75a, 75b and 75c, wherein piston 75a is positioned at the uppermost location within its cylinder 50 at a fully extended stroke, piston 75b being positioned outwardly from the uppermost position just prior to its fullest outwardly-extended mode of operation. Piston 75c is in an identical outwardly position as piston 75b; however, piston 75c is moving in an inwardly direction just following its peak outward movement.

With positions of the first group of pistons in mind, we now refer to FIG. 4 in which the second group of pistons 44 are shown in the identical corresponding positions. That is, piston 75d (See FIG. 5.) of the second group of pistons is located at the same position as 75a, as seen in FIG. 4. Pistons 75e and 75f will, in turn, correpond to the respective adjacent pistons 75b and 75c.

Thus, as the cam track and housing 100 rotates about the engine block 40, pistons 75a and 75d will reciprocate together within their own respective cylinders. This is also true for pistons 75b and 75e, which will operate simultaneously, and both adjacent pistons 75c and 75f.

It is important to note that the two groups of pistons are tri-radially disposed within the engine block; and each piston of each group is found to be 120° out of phase with its next succeeding piston, in reference to intake, compression, power, and exhaust cycle — as the housing 100 rotates with the central axis of the drive shaft. This, in combination with the 360° cam track to which the pistons are operably connected, provide sequential firing of the pistons, which will hereinafter be described in detail.

Hence, we now refer to the cam track and its particular configuration with respect to the 120° out-of-phase location of each piston. The cam track comprises a plurality of curvilinear portions which include four somewhat semicircular sections indicated at 180, 182, 184, and 186, respectively. Each of said semi-circular sections extends outwardly and is inclined inwardly toward the central axis, forming a continuous track having a peaked intersection. That is, a semi-circular track portion 180 extends substantially flat at 188, which represents the leading extension, and then extends to the opposite side at 190, representing the trailing substantially-flat track to which it is joined integrally by the leading track portion 192 of curve 182.

At the joining of track portions 190 and 192 there is formed a peak 194. Thus, the trailing track 196 joins the leading track 198 of curve 184, and the trailing track 200 of 184 joins the flat track portion 202 of curve 186, forming a peak at 204.

It can be seen in FIG. 3 that the cam follower 96 secured to piston 75a is located on the peak 204, thus positioning piston 75a at its uppermost location within its cylinder. This position also holds true with respect to the position of piston 75d.

As the cam track rotates clockwise, the follower 96 traverses downwardly to its lowermost extended stroke when passing through the arc of the semi-circular curve 186. However, to properly relate the meaning of the various sections of the cam track with respect to the first group of pistons, it should be noted that track section 202 should be considered as "power", providing downward movement of piston 75a just after firing, which occurs when the cam follower 96 reaches peak 204 and the drive shaft is positioned to seal the combustion chamber by its outer tubular wall 140.

As the cam follower passes curve 186, it traverses along track portion 206 which represents the "exhaust"; i.e., the piston reciprocates inwardly, forcing the exhaust gas out of the chamber 50 and through exhaust opening 162, which is at this point aligned with said opening 64. Follower 98 continues along the moving track portion 188, this section being represented as "intake", whereby fuel is drawn into the cylinder chamber as the piston is pulled downwardly, at which time fuel outlet port 145 is rotatably aligned with opening 64. This particular position is shown with respect to piston 75b in chamber 52, in which fuel cell 138 communicates with chamber 52 through said valve opening 145 in the outer wall 140 of the drive shaft 16. With the continuous rotation of the housing 100, the cam follower passes through curve 180 and into track section 190 which provides "compression". Therefore, after following piston 75a through one cycle, it is thus understood that each piston sequentially reacts to the rotating cam track. Since, however, said cam track is a 360° closed annular channel, each individual piston is provided with two complete firing cycles per one revolution of the drive shaft and housing.

Accordingly, track section 192 represents "power"; section 196 represents "exhaust"; track section 198 represents "intake"; and cam track section 200 represents "combustion". Thus, a second complete firing cycle is provided as the housing makes a full 360° rotation.

Further, it should be understood that, at the time piston 75a is traversing the "power" section 202, its adjacent piston 75d of the second group of pistons is traversing section 202' (See FIG. 4.) which represents "intake". Thus, section 206' represents "compression"; section 188' is "power"; section 190' is "exhaust"; 192' is "intake"; 196 is "compression"; 198' equals "power"; and 200' represents "exhaust".

Accordingly, an overlapping of power stroke for each succeeding firing piston occurs throughout each revolution of the housing 100, providing a very smooth operating engine. This overlapping of power takes place as follows.

Starting with piston 75a as the first firing piston, said piston travels along track section 202. As the cam follower moves to a point 30° from its firing peak 204, piston 75f of the second group moves 30°, at which time piston 75f reaches it firing peak and thus fires 15° before piston 75a traverses area 186 of the cam track. That is, piston 75a has 15° yet to travel before it begins its exhaust mode — hence, overlapping of power occurs. (See the 15° mark at FIG. 3.) A progressive overlapping occurs between piston 75f with respect to piston 75b of the first group, followed by 75b overlapping piston 75d of the second group; said piston 75d, in turn, overlaps 75c of the first group, and 75c then overlaps the power stroke of piston 75e — and so on, in a continuous sequential order. This, therefore, provides a firing order for the pistons in the following manner: 75a - 75p - 75b - 75d - 75c - 75e.

Each group of pistons is thus provided with two firing peaks, the first group having its firing peaks at 204 and 194, which are positioned diametrically opposite to each other (See FIG. 3.), the second group having firing peaks 197' and 199'. (See FIG. 4.) The peaks 197' and 199' are displaced 90° out of phase with peaks 204 and 194, respectively, thereby creating 12 overlapping power strokes per one revolution.

SUMMARY

The following is a summary of one complete firing cycle wherein we will consider the intake stroke as the beginning of the cycle.

Thus, the first stroke is the intake stroke wherein the piston moves down in the cylinder, pulled by the cam means as the housing 100 rotates. The elongated valve slots 145 disposed in the synchronized drive let fuel and air, sucked by the piston's movement, come into the cylinder.

The second stroke is the compression, or squeezing, stroke. The housing 100 continues to rotate; and the cam means pushes the piston up again. The drive shaft 16 in synchronism with and attached to said housing 100 closes off the cylinder chamber, whereby the fuel-and-air mixture is compressed inside said cylinder.

As soon as the piston reaches the top of the cylinder, a spark plug lights the fuel and the explosion drives the piston downward. This is the third stroke — the power stroke. The piston is pushing the housing, instead of the housing pushing the piston.

The fourth stroke is the exhaust stroke, whereby the housing 100 pushes the piston through the cam means and up again; and exhaust valve opening 162 is aligned with the cylinder chamber, wherein the burned gases rush out into the exhaust system.

When the piston reaches the top of the stroke, the exhaust valve closes as the shaft rotates, thus providing a closed condition, to be rapidly followed by the fuel-outlet port which is ready for the intake stroke.

The invention and its attendant advantages will be understood from the foregoing description and it will be apparent that various changes may be made in the form, construction and arrangement of the parts of the invention without departing from the spirit and scope thereof, or sacrificing its material advantages, the arrangements hereinbefore described being merely by way of example, and I to not wish to be restricted to the specific forms shown or uses mentioned, except as defined in the accompanying claims.

I claim:

1. A rotary-cam, internal-combustion, radial engine, comprising:

a stationary motor block having a first and a second group of piston cylinders positioned radially outwardly from a centrally disposed longitudinal bore arranged normal to said groups of said cylinders, each of said cylinders including a reduced opening terminating in said central bore;

a first and a second group of pistons operably disposed within respective groups of piston cylinders, each of said pistons including a piston rod extending outwardly from said cylinder;

an explosive chamber within each of said cylinders disposed within the cylinder portion adjacent said longitudinal bore;

a hollow, tubular, drive shaft disposed for rotation within said longitudinal bore;

a fuel-intake system including a fuel-intake means arranged within said tubular drive shaft for operable communication with said cylinders;

an exhaust system including an exhaust means arranged within said tubular drive shaft for operable communication with said cylinders;

a rotatable housing fixedly connected to said drive shaft; and a cam means secured to said housing and operably attached to each of said piston rods, for operable rotation of said housing and reciprocating movement of said pistons.

2. An internal-combustion engine as recited in claim 1, wherein each of said first and second groups of pistons includes a set of three pistons wherein said first set of three pistons is juxtapositioned to said second set of three pistons, and wherein each adjacent piston of each set is in parallel alignment with the other.

3. An internal-combustion engine as recited in claim 2, wherein said cam means comprises:

a pair of annular cam tracks secured to the rotatable housing, for rotation therewith; and a cam follower attached to each free end of said piston rods and operably disposed within said tracks, each of said tracks being in direct alignment with corresponding sets of pistons.

4. An internal-combustion engine as recited in claim 3, wherein said fuel-intake system includes a fuel-intake manifold adapted to receive said drive shaft therethrough, and wherein said fuel-intake means comprises:

a plurality of intake openings disposed within the annular wall of said tubular drive shaft, said fuel-intake openings being positioned within said fuel-intake manifold;

a plurality of outlet ports aligned with said reduced openings of said cylinders, whereby fuel is allowed to enter and be disposed for firing within said explosive chambers; and a fuel cell arranged intermediate said fuel-intake openings and said fuel-outlet ports, whereby fuel is permitted to traverse therebetween.

5. An internal-combustion engine as recited in claim 4, wherein said exhaust system includes a pair of exhaust manifolds, each being positioned adjacent opposite ends of said drive shaft, wherein said shaft extends through each of said exhaust manifolds, and wherein said exhaust means comprises:

a first set of exhaust ports located within the proximate forward end of said drive shaft and positioned within said exhaust manifold;

a second set of exhaust ports located about the proximate rearward end of said shaft, said ports being operably received within said respective exhaust manifolds;

a third and fourth sets of exhaust ports disposed within said wall of said tubular shaft, said third and fourth sets of exhaust ports being operably aligned with respective cylinders, whereby exhaust gases can pass therethrough; and a passage within said tubular shaft, whereby all of said exhaust ports communicate therebetween to allow said gases to pass to atmosphere through said exhaust manifolds.

6. An internal-combustion engine as recited in claim 5, wherein said fuel outlet ports and said third and fourth sets of exhaust ports are in annular alignment and alternately interposed between each other for sequential alignment with said respective cylinders during rotation of said drive shaft.

7. An internal-combustion engine as recited in claim 5, wherein said fuel cell is defined by the outer wall of said tubular shaft and a reduced diameter tubular wall co-axially disposed within said tubular shaft, forming an annular passage therebetween having sealed closed ends.

8. An internal-combustion engine as recited in claim 7, wherein each of said cam tracks provides two 4-cycle stroke sequences per one revolution of said track and said drive shaft.

9. An internal-combustion engine as recited in claim 7, wherein each of said cam tracks includes two oppositely firing peaks positioned 180° apart, thereby providing two separate firing strokes per one revolution of said cam track and said drive shaft.

10. An internal-combustion engine as recited in claim 9, wherein said firing peaks of one of said cam tracks are disposed 90° to that of said firing peaks of the other said cam track, thereby providing an alternate sequential firing of said pistons.

11. An internal-combustion engine as recited in claim 10, wherein each of said 180° between each of said firing peaks of said cam tracks comprises:

a power stroke section;

an exhaust section;

an intake section; and a compression section.

12. An internal-combustion engine as recited in claim 11, wherein each of said sections of said cam track extends 45° from one section to the succeeding section thereof.

13. An internal-combustion engine as recited in claim 12, wherein each firing stroke of one of said pistons overlaps the firing stroke of the proceeding fired piston.

14. An internal-combustion engine as recited in claim 13, wherein the overlapping stroke takes place along the last 15° of travel along the power section of said cam track.

15. An internal-combustion engine as recited in claim 6, wherein said rotatable housing comprises:

a front casing;

a center casing; and a rear casing; and wherein said cam tracks are formed as integral parts thereof.

16. An internal-combustion engine as recited in claim 15, wherein said rotatable housing includes a starter ring gear affixed thereto for rotation therewith.

* * * * *